(12) United States Patent
Kuri

(10) Patent No.: US 7,063,616 B2
(45) Date of Patent: Jun. 20, 2006

(54) READABLE STORAGE MEDIUM STORING ACTION GAME PROGRAM, AND ACTION GAME DEVICE AND CONTROL METHOD FOR SAME

(75) Inventor: Koji Kuri, Amagasaki (JP)

(73) Assignee: Konami Corporation, Tokyo (JP)

( * ) Notice: Subject to any disclaimer, the term of this patent is extended or adjusted under 35 U.S.C. 154(b) by 885 days.

(21) Appl. No.: 09/860,293

(22) Filed: May 18, 2001

(65) Prior Publication Data

US 2001/0044334 A1 Nov. 22, 2001

(30) Foreign Application Priority Data

May 19, 2000 (JP) .................................... 2000-148682

(51) Int. Cl.
*A63F 13/00* (2006.01)

(52) U.S. Cl. .............................. 463/4; 463/3
(58) Field of Classification Search ............... 463/4, 463/3, 1–2, 5, 30–34, 46; 273/433–438, 460
See application file for complete search history.

(56) References Cited

U.S. PATENT DOCUMENTS 5,601,487 A * 2/1997 Oshima et al. ............... 463/4
5,967,898 A * 10/1999 Takasaka et al. ............ 463/37
6,270,413 B1 * 8/2001 Aikawa et al. ............... 463/31
6,280,323 B1 * 8/2001 Yamazaki et al. ............. 463/4
6,394,894 B1 * 5/2002 Okitsu et al. .................. 463/3

FOREIGN PATENT DOCUMENTS

| EP | 0 758 117 | 2/1997 |
| EP | 0 836 871 | 4/1998 |
| EP | 0 844 580 | 5/1998 |
| JP | 07-112073 | 5/1995 |
| JP | 07302159 | 11/1995 |
| JP | 09276548 | 10/1997 |
| JP | 10225572 | 8/1998 |
| JP | 11-090046 | 4/1999 |
| JP | 11342265 | 12/1999 |
| JP | 2000-061142 | 2/2000 |
| JP | 01259219 | 9/2001 |

\* cited by examiner

*Primary Examiner*—Carl S. Miller
(74) *Attorney, Agent, or Firm*—Jordan and Hamburg LLP

(57) ABSTRACT

A user is able to play a game with a more realistic sensation of being an actual player. In a video game device main unit 1, a button press detecting section 103 detects the force with which buttons on a controller 5 are depressed, and a left stick operation detecting section 105 detects the speed at which an analogue stick on the controller 5 is inclined, and the angular speed at which the analogue stick is rotated. A ball path of travel setting section 104 sets the speed and path of travel of the ball, or the like, according to the force detected by the button press detecting section 103, and the speed and angular speed detected by the left stick operation detecting section 105.

6 Claims, 12 Drawing Sheets

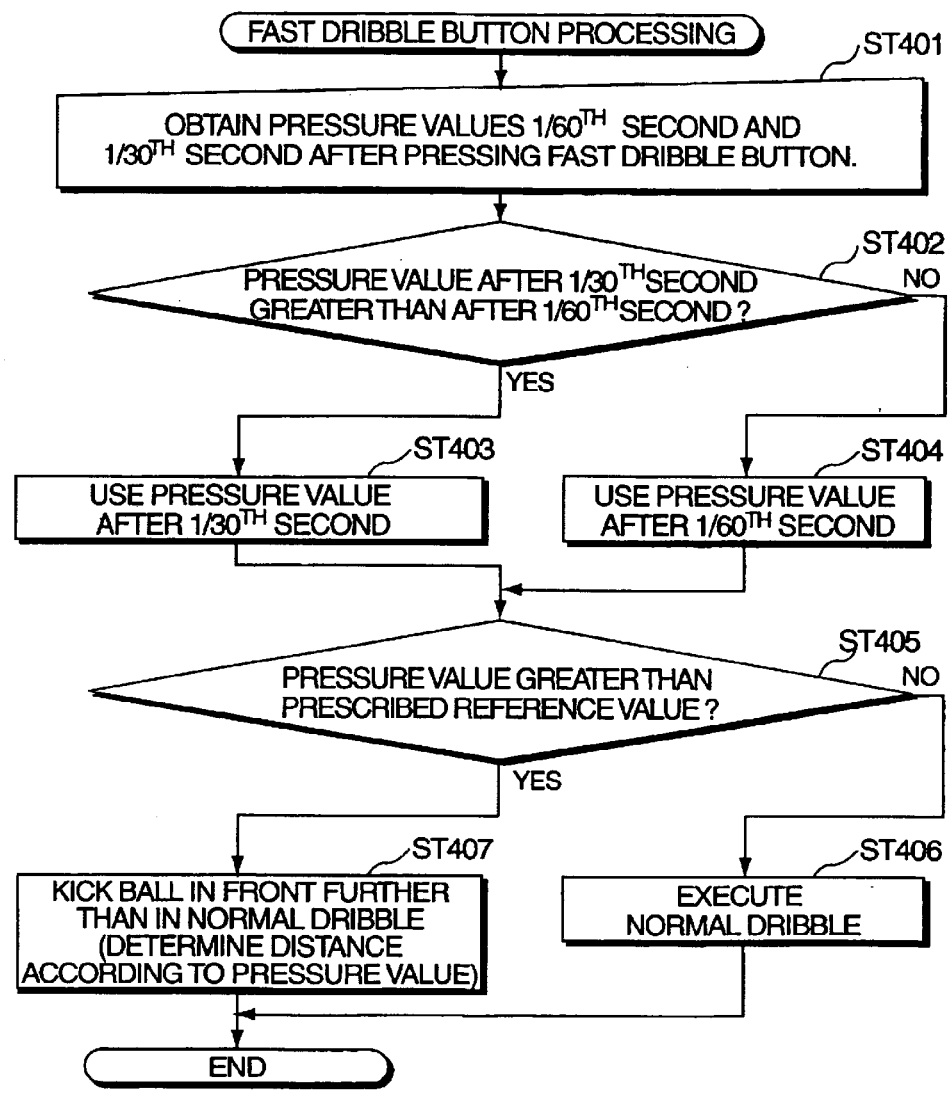

READABLE STORAGE MEDIUM STORING ACTION GAME PROGRAM, AND ACTION GAME DEVICE AND CONTROL METHOD FOR SAME

BACKGROUND OF THE INVENTION

1. Field of the Invention

The present invention relates to an action game device which receives input of instructions from a player and performs control in such a manner that prescribed actions are performed on a screen, in accordance with the input instructions.

2. Description of the Related Art

In the prior art, action games are known wherein a user (operator of the game device) is able to undergo a simulated experience of a sport, such as soccer, or the like. In an action game of this kind, player characters belonging to the same team are controlled by the user, and the user's main objective is to beat an opposing team.

In an action game of this kind modelled on soccer, with movement of the soccer ball, a player character of the same team who is near to the ball is selected by the game device, and by using a prescribed controller, the user gives an instruction to that player character near the ball. By repeating instructions to the player character near the ball, via the controller, the user can cause the ball to be passed between player characters of the same team, whilst avoiding the player characters of the opposing team operated by the game device, and ultimately, the user can attempt a shot at goal.

The controller used in an action game of this kind is a controller which is used, for example, to instruct the player character in possession of the ball (selected by the game device) to pass the ball to a home player character, or to instruct the player character to take a shot at goal, the user being able to adjust the flight distance and speed of the ball, and the like, by means of the detected time period for which the buttons provided on the controlled are depressed in giving the instruction.

However, if the ball flight distance, speed, and the like, is adjusted by detecting the time period for which buttons are depressed, as in a prior art controller as described above, then the operations performed by the user will needlessly take a long time compared to the real-time characteristics demanded in order to reproduce a soccer game.

In other words, since a game device using a prior art controller determines the ball flight distance, speed, and the like, according to the button depression time period, and the time period coinciding with the depressing of the buttons is divided off, thereby changing the motion of the player character in possession of the ball, then a period of time is required after the user starts to depress the button until an input value corresponding to the button depression time period is detected, and hence the user requires a needlessly long period of time to give a pass or shoot instruction, or the like, compared to real-time characteristics required to reproduce a soccer game. Thereby, the user is prevented from experiencing a simulated soccer game with the sensations of an actual player.

SUMMARY OF THE INVENTION

The present invention was devised with the foregoing in view, an object thereof being to provide a readable storage medium storing an action game program, and an action game device and control method for same, whereby a user can play a game with a more realistic sensation of being an actual player.

In order to achieve the aforementioned object, a first action game program stored in a readable storage medium according to the present invention is an action game program for receiving input of instructions to a player character in possession of a ball existing in a game space and displayed on a screen, according to prescribed buttons, and performing control in such a manner that the ball is moved according to the input instructions.

According to this first action game program, the force (strength) with which a button is depressed is detected; and the speed at which the ball is moved is set according to the detected force (strength).

A second action game program stored in the readable storage medium relating to the present invention is an action game program for receiving input of a first instruction relating to an action for a player character in possession of a ball existing in a game space and displayed on a screen, according to prescribed buttons, receiving input of a second instruction relating to a reference direction originating at the player character, and performing control in such a manner that the ball is moved in accordance with the input first instruction, to a same team player character located within a prescribed horizontal angle from the reference direction according to the input second instruction.

According to this second action game program, the force (strength) with which a button is depressed is detected; and the magnitude of the horizontal angle is set according to the detected force (strength).

A third action game program stored in the readable storage medium relating to the present invention is an action game program for receiving input of instructions for a player character who is not in possession of a ball existing in a game space and displayed on a screen, and performing control in such a manner that the player character is caused to perform prescribed actions with respect to an opposing player character who is in possession of the ball according to the input instructions.

According to this third action game program, the force (strength) with which a button is depressed is detected; and either a first action or a second action with respect to the opposing player character is set selectively, according to the detected force (strength).

A fourth action game program stored in the readable storage medium according to the present invention is an action game program for receiving input of a first instruction relating to an action for a player character in possession of a ball existing in a game space and displayed on a screen, receiving input of a second instruction specifying a reference direction originating at the player character by means of a prescribed stick, and performing control in such a manner that the ball is moved in accordance with the input first instruction, to a same team player character in the reference direction according to the input second instruction, without touching the ground on the way.

According to this fourth action game program, the speed at which the stick is inclined is detected; and the height that the ball reaches is set according to the detected speed.

A fifth action game program stored on the readable storage medium relating to the present invention is an action game program for receiving input of instructions for a player character existing in a game space and displayed on a screen, and performing control in such a manner that prescribed actions are performed in accordance with the input instructions.

According to this fifth action game program, the force (strength) with which a button is depressed is detected; and the speed of the action is set according to the detected force (strength).

A sixth action game program stored on the readable storage medium relating to the present invention is an action game program for receiving input of a first instruction relating to an action to a same team player character, for a player character in possession of a ball existing in a game space and displayed on a screen, receiving input of a second instruction specifying a reference direction originating at the player character, by means of a prescribed stick, and performing control in such a manner that the ball is moved in accordance with the input first instruction, to a prescribed target object in the reference direction according to the input second instruction, without touching the ground on the way.

According to this sixth action game program, the angular speed at which the stick is rotated is detected; and the magnitude of a curve applied to the ball is set according to the detected angular speed of the stick.

A seventh action game program stored on the readable storage medium relating to the present invention is an action game program for receiving input of a first instruction relating to an action for a player character in possession of a ball existing in a game space and displayed on a screen, according to prescribed buttons, receiving input of a second instruction specifying a reference direction originating at the player character, by means of a prescribed stick, and performing control in such a manner that the ball is moved in accordance with the input first instruction, to a prescribed target object in the reference direction according to the input second instruction, without touching the ground on the way.

According to this seventh action game program, the length for which the button is depressed and the speed at which the stick is inclined are detected; and the initial speed of the ball in the vertical direction and the acceleration of the ball in the vertical direction are set according to the detected length and the detected speed.

BRIEF DESCRIPTION OF THE DRAWINGS

FIG. 13 is a flowchart showing the sequence of dribble button processing executed when a dribble button 514 is depressed.

DESCRIPTION OF THE PREFERRED EMBODIMENTS

Below, a video game system incorporated in an embodiment of the present invention is described with reference to the drawings.

Figure 1:
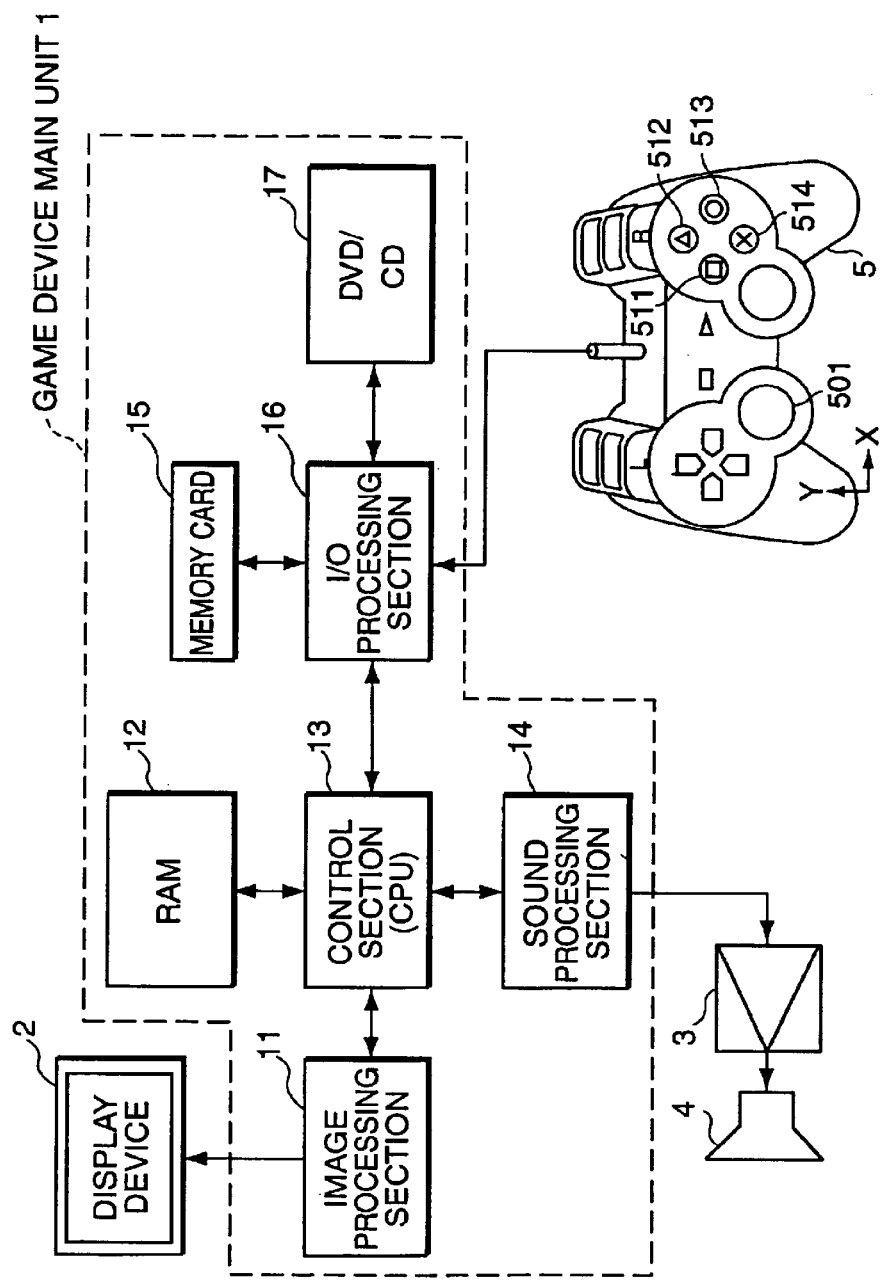
FIG. 1 is a diagram showing the overall composition of a video game system being one embodiment of the present invention.

FIG. 1 is a diagram showing the overall composition of a video game system, which is one embodiment of the present invention.

This video game system comprises a game device main unit 1 performing principal control whereby a user can execute a game, a display device 2, such as a CRT, or the like, for displaying video images on the basis of video image signal from the game device main unit 1, an AV amplifier 3 and speaker 4 for reproducing sounds (including music; same applied hereinafter) on the basis of sound signals from the game device main unit 1, and a controller 5 whereby the user inputs instructions to the game device main unit 1.

More specifically, the game device main unit 1 comprises a DVD-ROM/CD-ROM drive 17 for reading out programs, image data and sound data from a DVD-ROM or CD-ROM for a particular game; a RAM 12 for temporarily storing the program read out from the DVD-ROM (or CD-ROM; same applies hereinafter), and data used by this program, and the like; a control section (CPU) 13 for controlling the overall development of the game on the basis of the program in the RAM 12; a memory card 15 for storing data generated during the progress of the game (even after the power supply of the game device main unit 1 has been disconnected); an I/O processing section 16 for processing reading and writing of data to and from the memory card 15, reading of data from the DVD-ROM/CD-ROM drive 17, and inputs from the controller 5; an image processing section 11 for generating video image signals from the image data read out from the DVD-ROM, whilst performing specific image processing, such as drawing polygons, or the like; and a sound processing section 14 provided with an ADPCM sound source, for generating sound signals from sound data read out from a DVD-ROM.

In this video game system, in particular, a 3D action game simulating a soccer game is implemented using a program (stored in the DVD-ROM) which involves processing of button operations as illustrated subsequently in FIG. 2 to FIG. 13.

The left analogue stick 501 of the controller 5 connected to the I/O processing section 16 can be inclined freely through 360 degrees, from the stationary position thereof (where it is standing approximately vertically on the front face of the controller 5), and it is used to cause a player character near the ball (selected automatically) to move over the soccer field, whilst also serving to instruct the player character in possession of the ball which direction to kick the ball.

The [square] button 511, [triangle] button 512, [circle] button 513 and [cross] button 514 are principally used, respectively to instruct a search pass, shot, lofted pass and dribble, to the player character holding the ball, and hereinafter the [square] button 511, [triangle] button 512, [circle] button 513 and [cross] button 514 are respectively called the search pass button 511, shoot button 512, lofted pass button 513 and dribble button 514. (The search pass, shoot, lofted pass and dribble actions are described hereinafter.)

In this game device main unit 1, the pressure exerted when one of the buttons 511–514 is depressed is detected, and a value of 0 (state where button not depressed) to 255 (state where button depressed with maximum pressure) according to the pressure exerted by the user depressing the buttons, is acquired by the I/O processing section 16, once every $1/60^{th}$ second. Furthermore, the left analogue stick 501 has a position specified by XY co-ordinates, comprising a value of 0 (state where depressed fully to the left in FIG. 1)–255 (state where depressed fully to the right) in the x direction, and 0 (state where depressed fully upwards)–255 (state where depressed fully downwards) in the y direction, a position of (128, 128) being specified when it is in a stationary state. Note the pressure to be detected is "a force" per unit area in the dynamic sense according to the fundamental physics law, i.e., force (F)=mass (M) times acceleration ($\alpha$), so that it can exceed the maximum value when measured in statically. In other words, when the button is depressed quickly, it produces a great change in velocity in some time duration which leads the larger acceleration ($\alpha$) in that time duration that, in turn, increases the detected depressing force in the time duration.

Figure 2:
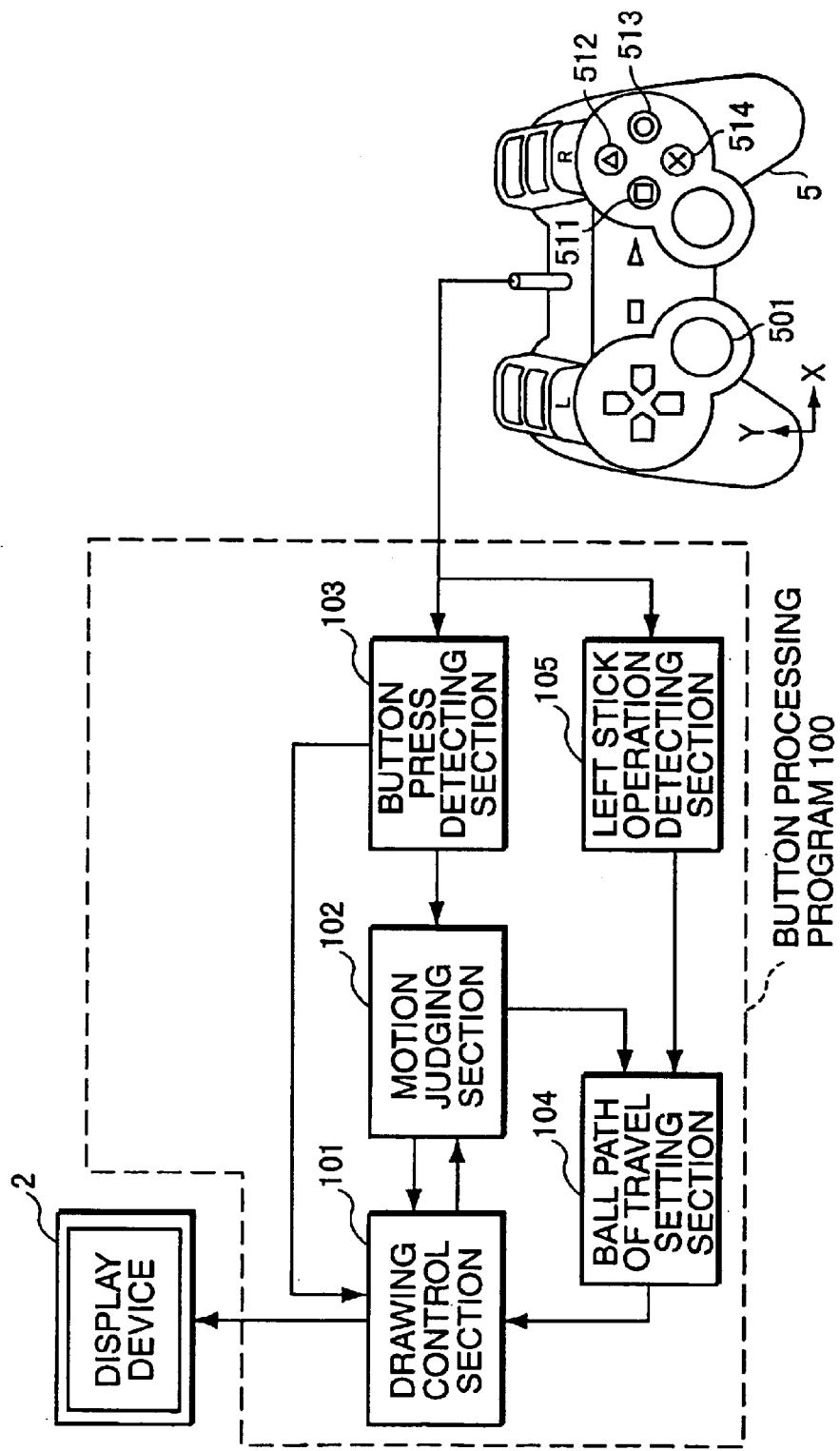
FIG. 2 is a block diagram showing the approximate composition of a button processing program 100 as executed by a game device main unit 1 according to the present invention.

FIG. 2 is a block diagram showing the approximate composition of a button processing program 100 executed by the game device main unit 1 according to the present invention (see FIG. 1). (The present invention relates to processing of button depressing operations, and this processing will be described in particular.)

The detailed procedures implemented when any one of the search pass button 511, shoot button 512, lofted pass button 513 or dribble button 514 is depressed are mutually different, but the programs performing these procedures have the same composition as the button processing program 100 described subsequently.

This button processing program 100 comprises: a button press detecting section 103 for detecting depression of a button (search pass button 511, shoot button 512, lofted pass button 513, dribble button 514) and the pressure value exerted when a button is pressed, from the controller 5; a left stick detecting section 105 for detecting operations corresponding to the left analogue stick 501, from the controller 5; a motion determining section 102 for detecting the state of a prescribed flag and determining movement of a player character being controlled by the user by means of the controller 5; a ball path of travel setting section 104 for setting the path of travel in which the ball will travel (when kicked by the player character), according to the movement of the player character as determined by the motion determining section 102 and the state of the left analogue stick as detected by the left stick operation detecting section 105, and the like; and a drawing control section 101 for controlling drawing of images output to the display device 2, in accordance with the path of travel of the ball as set by the ball path of travel setting section 104.

In practice, these various sections perform processing according to pressing operations of the search pass button 511, shoot button 512, lofted pass button 513, dribble button 514, by means of the procedures illustrated in FIG. 3, FIG. 6, FIG. 10 and FIG. 13.

Figure 3:
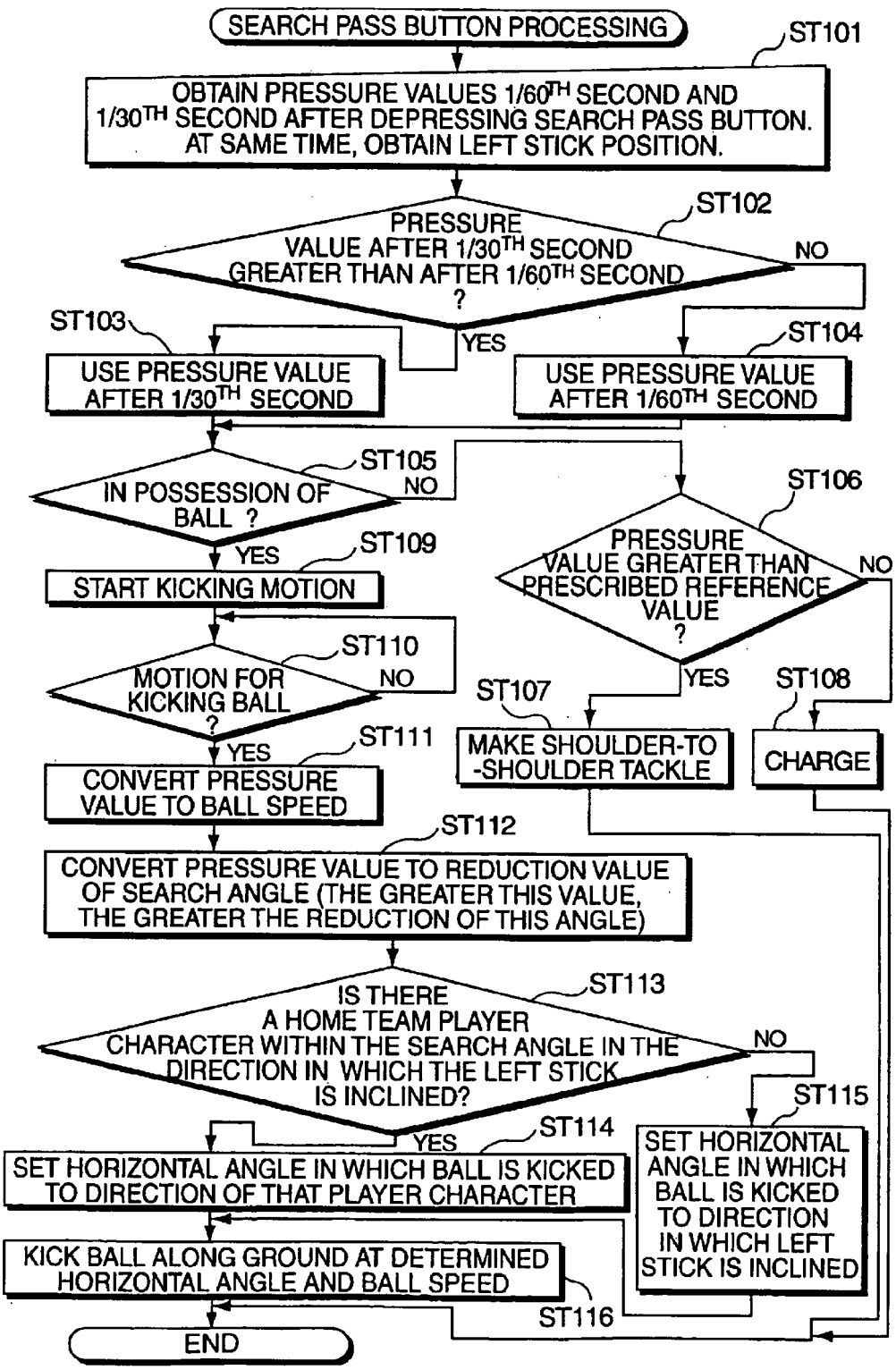
FIG. 3 is a flowchart showing the sequence of search pass button processing executed when a search pass button 511 is depressed.
Figure 4:
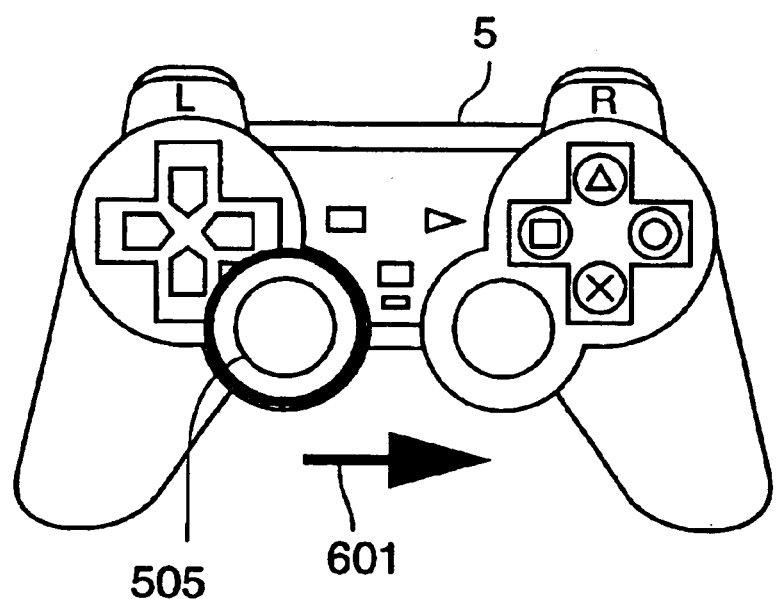
FIG. 4 is a diagram showing a direction 601 in which the left analogue stick 501 in inclined when the search pass button 511 is depressed.
Figure 5:
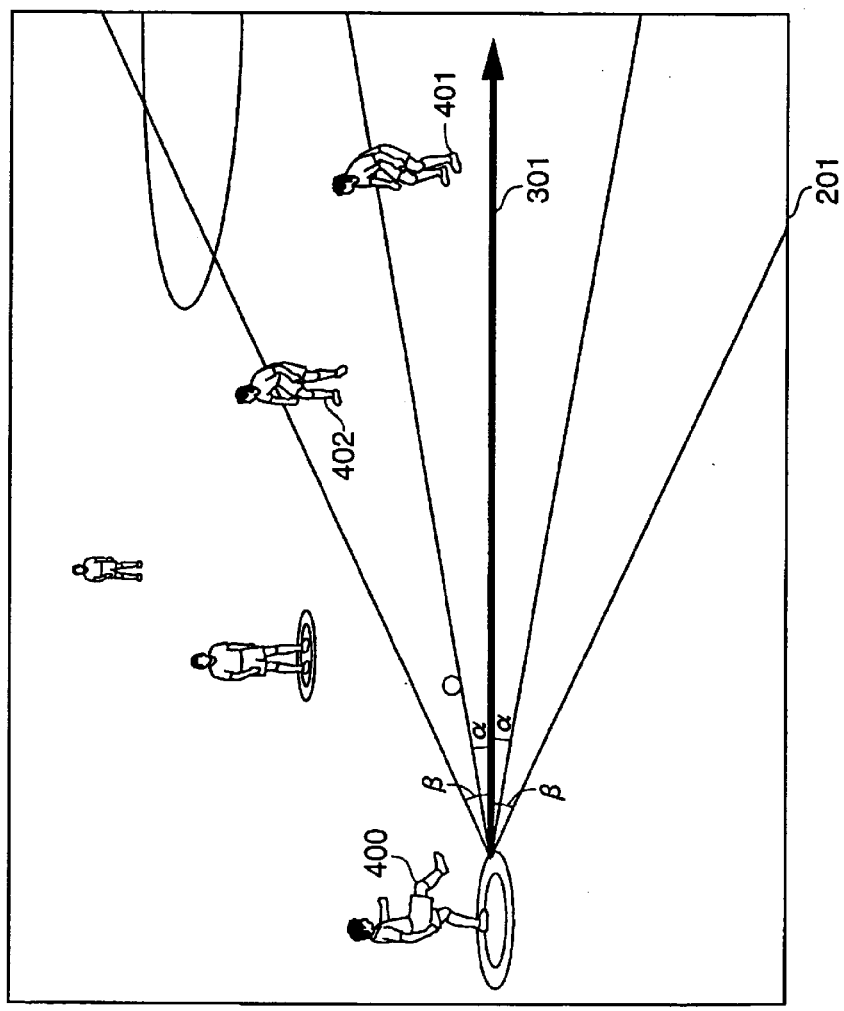
FIG. 5 is a diagram for describing a search angle set according to the direction 601 of the left analogue stick 501 illustrated in FIG. 4.

FIG. 3 is a flowchart showing a procedure for search pass button processing as executed when the search path button 511 is pressed. Moreover, FIG. 4 is a diagram showing the direction 601 of the left analogue stick 501 inclined whilst the search pass button 511 is pressed, and FIG. 5 is a diagram for describing a search angle set according to the direction 601 of the left analogue stick 501 illustrated in FIG. 4.

In "search pass", a reference direction is specified according to the direction in which the left analogue stick 501 is inclined, and of the same team player characters present within a prescribed horizontal angle either side of the specified reference direction (hereinafter, called the search angle), the player character nearest to the player character in possession of the ball is searched for and selected, and the ball is moved from the operated player character holding the ball (player character subject to the control of the user), towards the same team player character selected in this manner.

In the search pass button processing illustrated in FIG. 3, firstly, the button press detecting section 103 (see FIG. 2) obtains two pressure detection values, $1/60^{th}$ second and $1/30^{th}$ second after the search pass button 511 has been pressed, whilst simultaneously, the left stick operation detecting section 105 acquires the position of the left analogue stick 501 (ST101). The button press detecting section 103 then determines whether or not the pressure value obtained after $1/30^{th}$ second is greater than the pressure value obtained after $1/60^{th}$ second (ST102), and the higher pressure value is set for use in subsequent processing (ST103, ST104).

Thereupon, the motion determining section 102 detects whether or not the operated player character has kept the ball, according to a prescribed flag (the state of which changes according to whether or not the operated player character is in possession of the ball) (ST105).

If the operated player character has not kept the ball (No at ST105), then the motion determining section 102 further judges whether or not the pressure value of the search pass button 511 (set in ST103 and ST104) is greater than a prescribed reference value (for example, 200) (ST106), and if the pressure value is greater than the prescribed reference value (Yes at ST106), then the drawing control section 101 starts to perform drawing for a motion wherein the operated player character makes a shoulder-to-shoulder tackle on an opposing player character who is in possession of the ball (ST107), whereas if the pressure value is not greater than the prescribed reference value (No at ST106), then the drawing control section 101 starts drawing for a motion wherein the operated player character charges at the opposing player character in possession of the ball (ST108), whereupon the search path button processing terminates.

If the operated player character has kept the ball (Yes at ST105), then the drawing command section 101 starts drawing for a motion for kicking the ball (ST109), and the motion determining means 102 judges whether or not the operated player character has made a motion of kicking the ball, according to a prescribed flag (the state of which changes depending on whether or not the operated player character has kicked the ball at that instant) (ST110). If the operated player character has made a motion of kicking the ball (No at ST110), then the processing halts at ST110, whereas if the operated player character has made a motion of kicking the ball (Yes at ST110), then the ball path of travel setting section 104 converts the pressure value of the search path button (as set in steps ST103, ST104) into a ball speed (speed of ball in a horizontal direction) (ST111) and a search angle reduction value (ST112). (The greater the pressure value for the search pass button 511, the greater the reduction of the search angle from a previously determined set angle.)

Thereupon, the ball path of travel setting section 104 determines whether or not a same team player character is present within the vertical search angle in the reference direction in which the left analogue stick 501 is inclined, on the basis of the position of the left analogue stick 501 (as detected at ST101) (ST113), and if there is a home player character within the search angle (Yes at ST113), then the horizontal angle (in which the operated player character kicks the ball) is set as the direction of that home player character (ST114), whereas if there is no home player character within the search angle (No at ST113), then the horizontal angle is set as the reference direction in which the left analogue stick 501 is being inclined (ST115).

Thereupon, drawing is started (ST116) for depicting a motion wherein the ball travels along the ground from the operated player character on the basis of the ball speed obtained by conversion of the pressure value for the search path button 511 at ST116, and the horizontal angle set from the position of the left analogue stick 501 at ST114 or ST115.

In practice, according to this search pass button processing, when the left analogue stick 501 is inclined in the direction 601 shown in FIG. 4, the reference direction is set as direction 301, as illustrated by the game screen 201 in FIG. 5. If the search pass button 511 is pressed very hard (for example, a pressure value of 200 is detected), then a search angle of 2·α is set to either side of the reference direction 301, and a ball path of travel is set in such a manner that the ball passes along the ground from the operated player character 400 to the player character 401, whereas if the search pass button 511 is pressed lightly (a pressure value of 100 being detected), then a search angle of 2·β is set to either side of the reference direction 301, and the ball path of travel is set in such a manner that the ball passes along the ground to the home player character 402 (positioned nearer to the operated player character 400 than the home player character 401).

In this way, according to the search pass button processing, the ball speed (in the horizontal direction) is increased and the search angle is narrowed, the harder the search pass button 511 is pressed, and by means of a momentary operation of the button and analogue stick (without requiring a large amount of time needlessly to set up one motion, as in the prior art), the user is able to experience a soccer game producing a more realistic sensation of being a player.

Moreover, according to this search pass button processing, a plurality of operations, such a shoulder-to-shoulder tackling or charging down an opposing player character holding the ball, can be instructed to an operated player character who is not in possession of the ball, according to the force (strength) with which the search pass button 511 is pressed, and hence a variety of instructions can be given selectively by the user, by means of few button operations, thereby making it possible to play a game that is highly responsive and highly interesting.

Figure 6:
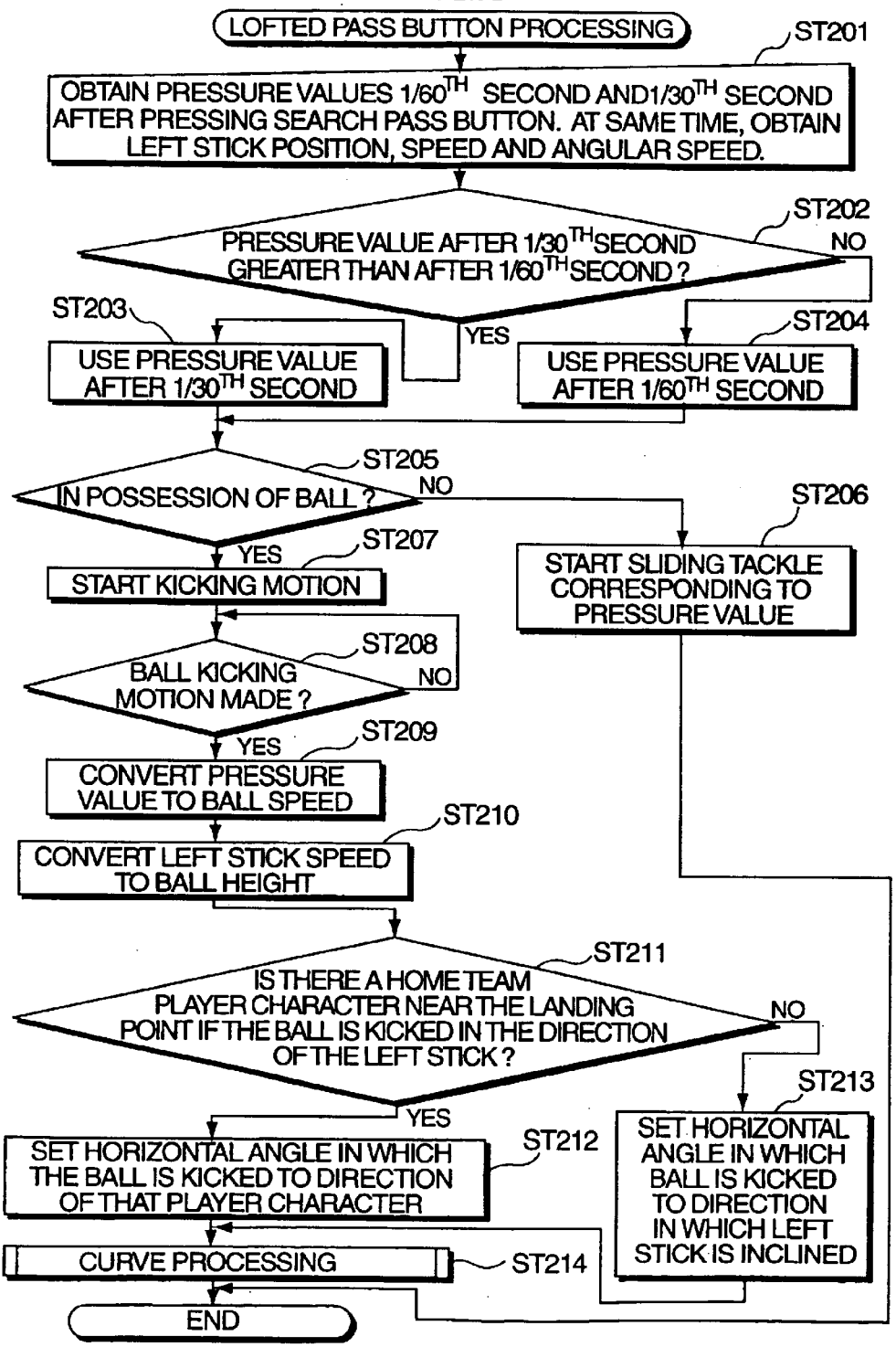
FIG. 6 is a flowchart showing the sequence of lofted pass button processing executed when a lofted pass button 513 is depressed.
Figure 7:
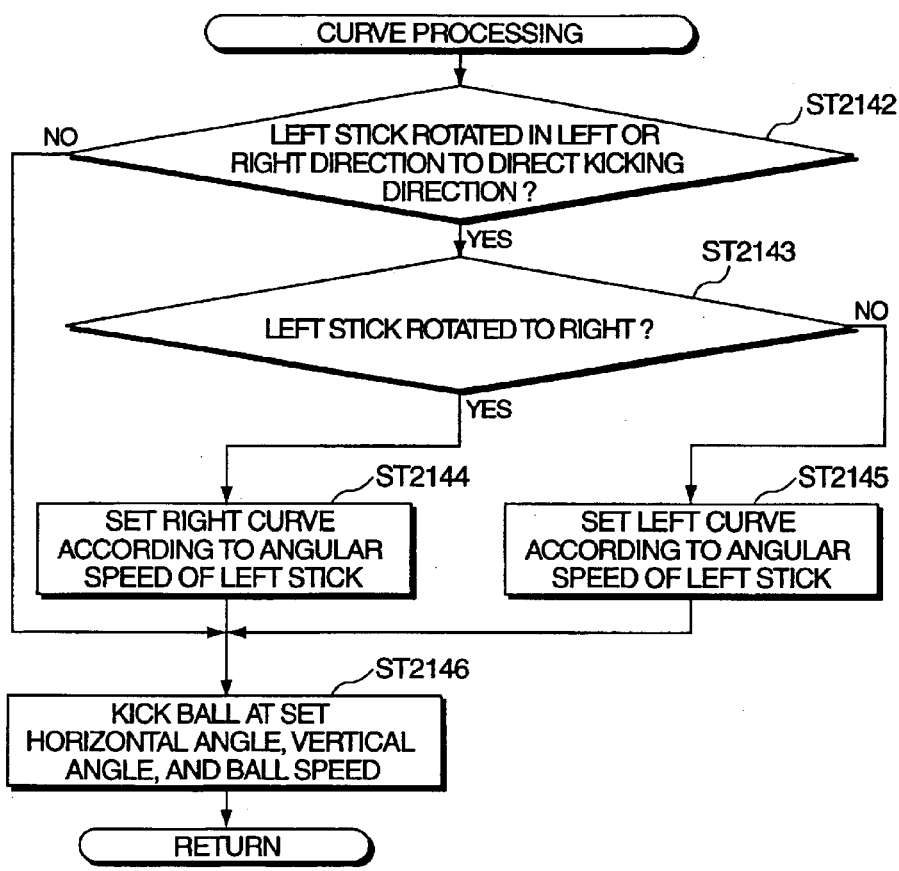
FIG. 7 is a flowchart showing the sequence of curve processing executed as the processing of step ST214 in the lofted pass button processing shown in FIG. 6 (or as the processing of step ST311 in the shoot button processing shown in FIG. 10)
Figure 8:
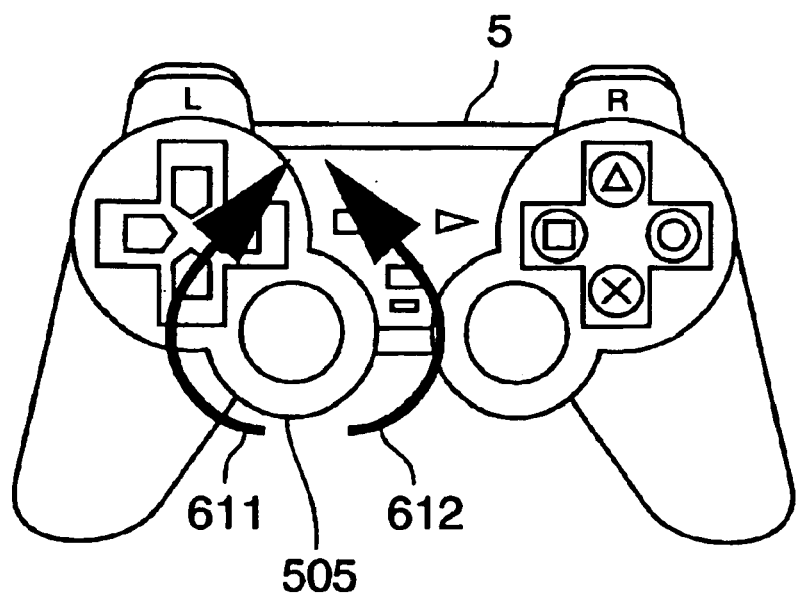
FIG. 8 is a diagram showing rotational directions 611, 612 in which the left analogue stick 501 is rotated when the lofted pass button 513 is depressed.
Figure 9:
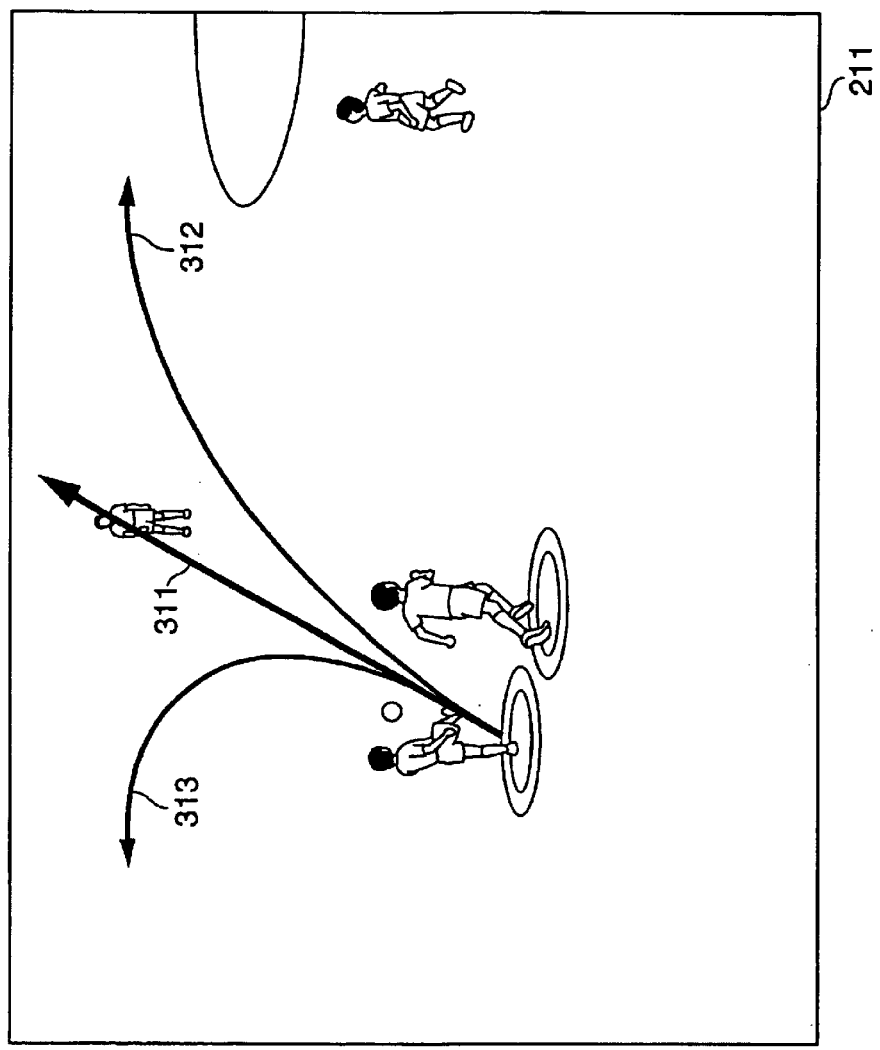
FIG. 9 is a diagram for describing a left curve and a right curve set respectively in accordance with the rotational directions 611, 612 of the left analogue stick 501 shown in FIG. 8.

FIG. 6 is a flowchart showing a procedure of lofted pass button processing executed when the lofted pass button 513 is pressed, and FIG. 7 is a flowchart showing a procedure of curve processing executed as the processing at step ST214 of the lofted pass button processing shown in FIG. 6 (or as the processing at step ST311 of the shoot button processing illustrated in FIG. 10 described hereinafter). Furthermore, FIG. 8 is a diagram showing the rotational directions 611, 612 of a left analogue stick 501 rotated whilst pressing down the lofted pass button 513, and FIG. 9 is a diagram for describing a left curve and right curve set respectively in accordance with the rotational directions 611, 612 of the left analogue stick 501 shown in FIG. 8.

In a "lofted pass" operation, similarly to the search pass operation described above, a reference direction is specified according to the direction in which the left analogue stick 501 is inclined, the ball path of travel is adjusted to a direction from the operated player character in possession of the ball towards a home player character positioned near to a predicted landing point in this reference direction, and the ball is moved accordingly.

In the lofted pass button processing illustrated in FIG. 6, firstly, the button press detecting section 103 (see FIG. 2) obtains two pressure detection values, $\frac{1}{60}^{th}$ second and $\frac{1}{30}^{th}$ second after the lofted pass button 513 has been pressed, and simultaneously, the left stick operation detecting section 105 acquires the position, speed and angular speed of the left analogue stick 501 (ST201). (In practice, the speed and angular speed of the left analogue stick 501 is obtained by calculating the position of the left analogue stick 501 as progressively stored in a prescribed RAM once every $\frac{1}{60}^{th}$ second.) The button press detecting section 103 further detects whether or not the pressure value obtained after $\frac{1}{30}^{th}$ second is greater than the pressure value after $\frac{1}{60}^{th}$ second (ST202), and set the greater pressure value for use in subsequent processing (ST203, ST204).

The motion judging section 102 then detects whether or not the operated player character is in possession of the ball, by means of a prescribed flag (ST205).

If the operated player character is not in possession of the ball (No at ST205), then the drawing control section 101 starts drawing for a motion wherein the operated player character slide in towards an opposing player character holding the ball, at a speed corresponding to the pressure value (ST206), whereupon the lofted pass button processing terminates.

If the operated player character is in possession of the ball (Yes at ST205), then the drawing control section 101 starts drawing for a motion of kicking the ball (ST207), and the motion determining section 102 then detects whether or not the operated player character has made a motion of kicking the ball, by means of a prescribed flag (ST208). If the operated player character has not made a motion of kicking the ball (No at ST208), then the processing terminates at ST208, whereas if the operated player character has made a motion of kicking the ball (Yes at ST208), then the ball path of travel setting section 104 converts the pressure value for the lofted pass button 513 (as set at ST203, ST204) to a ball speed (speed in the horizontal direction of the ball) (ST209), and it converts the speed at which the left analogue stick 501 is inclined (as acquired at ST201) into a height of the ball (the initial speed of the ball in the vertical direction and the vertical angle of the ball at the time that it is kicked) (ST210). (Here, the greater the speed at which the left analogue stick 501 is inclined, the higher the resulting height of the ball.)

Next, the ball path of travel setting section 104 determines whether or not there is a home player character near the landing point in a case where the ball is kicked in the reference direction in which the left analogue stick 501 is inclined (ST211), and if there is a home player character near the landing point (Yes at ST212), then the horizontal angle (in which the operated player character kicks the ball) is set to the direction of that home player character (ST212), and if there is no home player character near to the landing point (No at ST212), then the horizontal angle is set to the reference direction in which the left analogue stick 501 is inclined (ST213).

Thereupon, curve processing (ST214) (the procedure of which is indicated below with reference to FIG. 7) is performed, and the lofted pass button processing terminates.

In the curve processing illustrated in FIG. 7, firstly, the ball path of travel setting section 104 determines which direction the ball is to be kicked (reference direction) from whether the left analogue stick 501 has been rotated in the left or rightward direction, on the basis of the angular speed of the left analogue stick 501 obtained at ST201 in the lofted pass button processing (or ST301 in the shoot button processing described hereinafter) (S2142, ST2143).

If the reference direction has been set to the right by rotating the left analogue stick 501 to the right (Yes at ST2142, Yes at ST2143), then a right curve is set according to the angular speed of the left analogue stick 501 (ST2144), and if the reference direction has been set to the left by rotating the left analogue stick 501 to the left (Yes at ST2142, No at ST2143), then a left curve is set according to the angular speed of the left analogue stick 501 (ST2145), (namely, the angular speed of the left analogue stick 501 is set in such a manner that it is converted into rotation of the horizontal direction of the ball), whereupon the procedure moves to ST2146.

If the ball is kicked in the set direction without the left analogue stick 501 being rotated in either the left or rightward directions (No at ST2142), then the procedure moves to ST2146, without setting any curve.

At ST2146, the drawing control section 101 starts drawing for depicting a motion wherein a lofted ball is caused to move from the operated player character (or a motion wherein the ball is caused to move from the operated player character towards the goal in a shot), on the basis of the ball speed (speed of the ball in the horizontal direction) obtained by conversion of the pressure value of the lofted pass button 413 at ST209 of the lofted pass button processing (or by conversion of the pressure value of the shoot button 512 at ST307 of the shoot button processing), a horizontal angle set by the position of the left analogue stick 501 in ST212 or ST213 of the lofted pass button processing (or ST308 of the shoot button processing) and corrected according to the curve, and a vertical angle converted by ST210 of the lofted pass button processing (ST2146), whereupon the curve processing terminates and the procedure returns to the lofted pass button processing (or the shoot button processing).

According to this curve processing and lofted pass button processing (or shoot button processing), in practice, when the left analogue stick 501 is rotated to the right in the direction 611 in FIG. 8 to incline the direction in which the ball is kicked, whilst the lofted pass button 513 (of the shoot button 512) is depressed, then as shown in the game screen 211 in FIG. 9, the ball path of travel (acceleration of the ball in the horizontal direction) is set in such a manner that the ball flies in a direction 312 curving to the right from the reference direction 311, and when the left analogue stick 501 is rotated to the left in the direction 612 in FIG. 8 to incline the direction in which the ball is kicked, then as shown in the game screen 211 in FIG. 9, the ball path of travel (acceleration of the ball in the horizontal direction) is set in such a manner that the ball flies in a direction 313 curving to the left from the reference direction 311, and in particular, the curve set in this way specifies the acceleration of the ball in the horizontal direction, in accordance with the angular speed of the left analogue stick 501.

In this way, by means of the lofted pass button processing, the speed of the ball (in the horizontal direction) is set to a greater speed, the harder the pressure exerted on the lofted pass button 513, and the greater the height reached by the ball, the more quickly the left analogue stick 501 is inclined, thereby enabling a user to experience a soccer game with a more realistic sensation of being a player, by means of momentary button and analogue stick operations (without requiring a large amount of time needlessly in order to set up one motion, as in the prior art).

Moreover, by means of this lofted pass button processing, an operated player character who is not in possession of the ball can be instructed to perform a sliding tackle at a speed corresponding to the pressure exerted on the lofted pass button 513, and hence a variety of instructions can be given selectively by the user, by means of few button operations, thereby making it possible to play a game that is highly responsive and highly interesting.

Moreover, by means of this curve processing, when a user instructs an operated player character who is in possession of the ball to make a lofted pass by pressing the lofted pass button 513 (or the shoot button 512), then by rotating the left analogue stick 501 simultaneously, the user can apply a leftward or rightward curve having a magnitude corresponding to the angular speed of the left analogue stick 501, thereby making it possible to play a game that is highly responsive and highly interesting.

Figure 10:
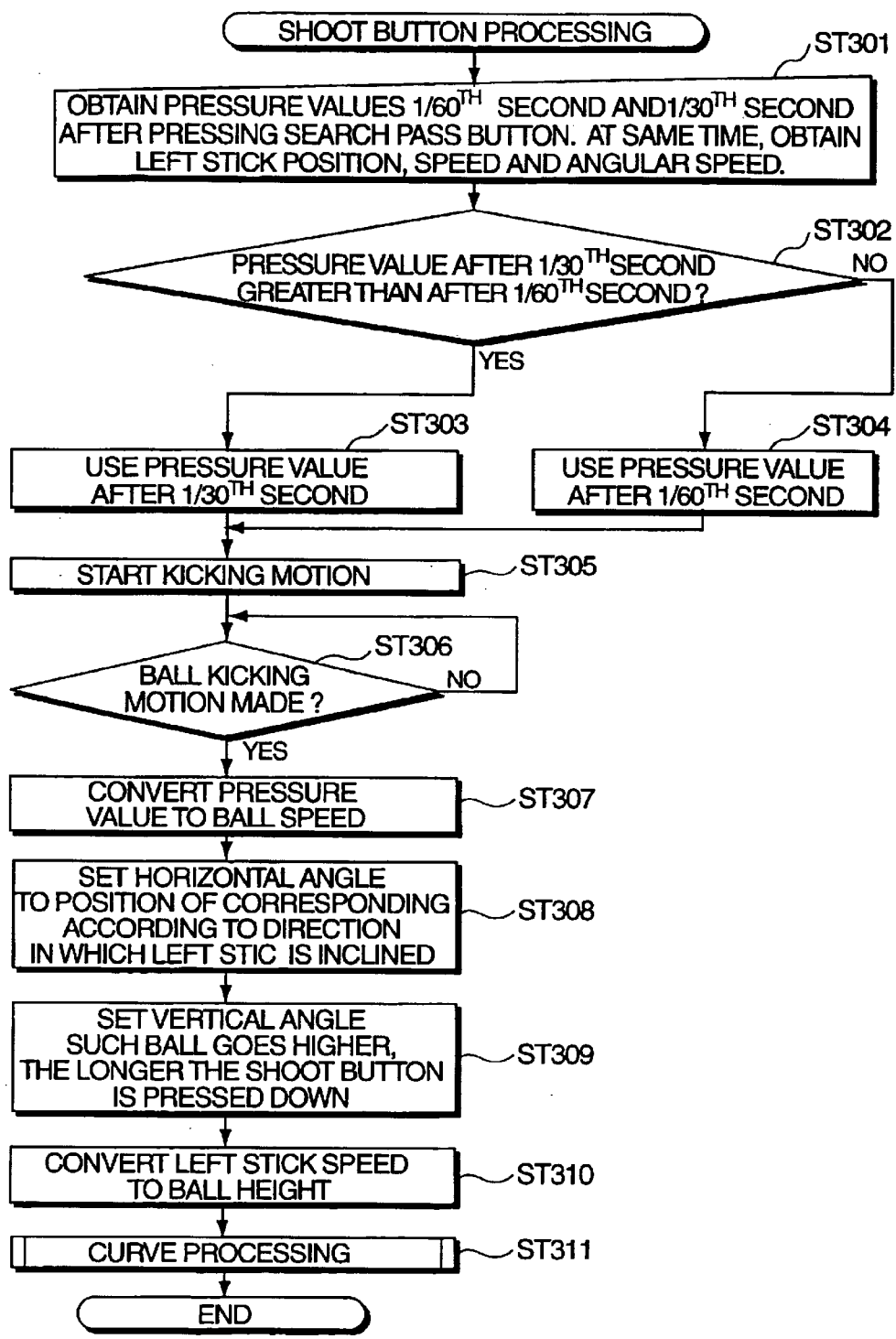
FIG. 10 is a flowchart showing the sequence of shoot button processing executed when a shoot button 512 is depressed.
Figure 11:
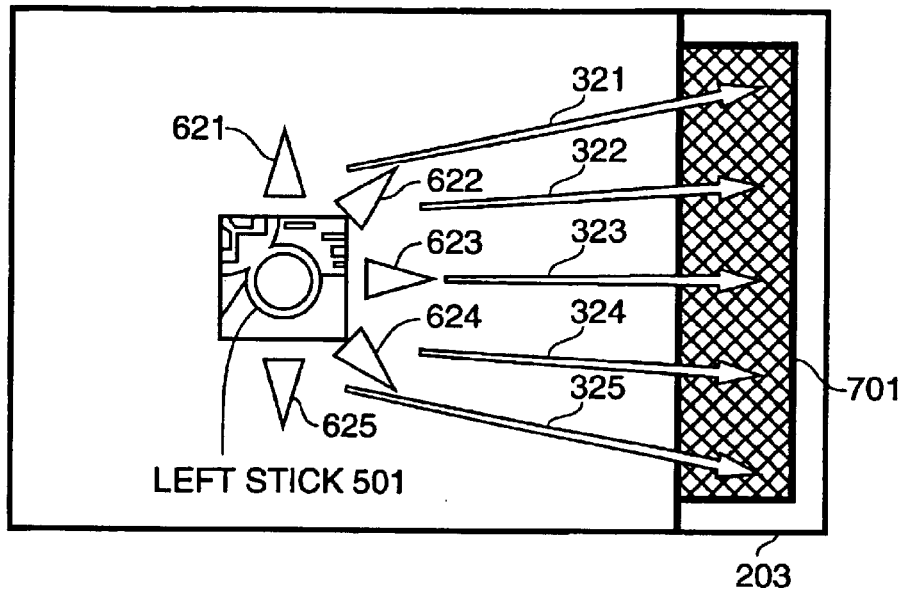
FIG. 11 is a diagram for describing the shoot direction (horizontal direction) of a ball in the shoot button processing in FIG. 10.
Figure 12:
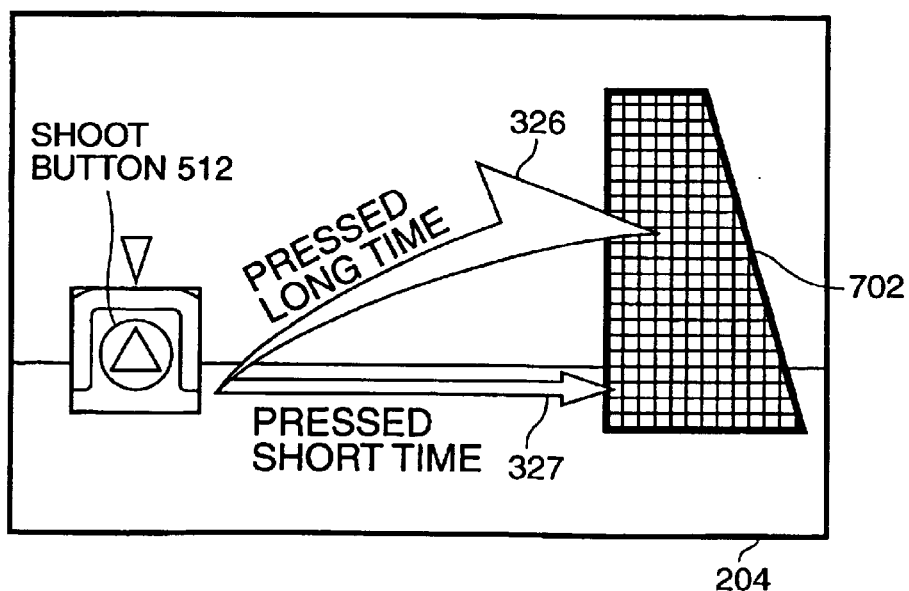
FIG. 12 is a diagram for describing the shoot direction (vertical direction) of a ball in the shoot button processing in FIG. 10.

FIG. 10 is a flowchart showing a procedure of shoot button processing as executed when the shoot button 512 is depressed. Moreover, FIG. 11 is a diagram for describing the shoot direction (horizontal direction) of the ball during the shoot button processing in FIG. 10, and FIG. 12 is a diagram describing the shoot direction (vertical direction) of the ball in this shoot button processing.

In a "shoot" operation, similarly to the search pass and lofted pass operations described above, a reference direction is specified according to the direction in which the left analogue stick 501 is inclined, and the ball is moved from the operated player character in possession of the ball, in the reference direction towards the goal.

In the short button processing illustrated in FIG. 10, firstly, the button press detecting section 103 (see FIG. 2) obtains two pressure values, $\frac{1}{60}^{th}$ second and $\frac{1}{30}^{th}$ second after the shoot button 512 has been depressed, and simultaneously, the left stick operation detecting section 105 acquires the position, speed and angular speed of the left analogue stick 501 (ST301). The button press detecting means 103 also determines whether or not the pressure value after $\frac{1}{30}^{th}$ second is greater than the pressure values after $\frac{1}{60}^{th}$ second (ST302), and the greater pressure value is set for use in subsequent processing (ST303, ST304).

Thereupon, the drawing command section 101 starts drawing for a motion of kicking the ball (ST305), and the motion determining section 102 then detects whether or not the operated player character has made a motion of kicking the ball, by means of a prescribed flag (ST306). If the operated player character has not made a motion of kicking the ball (No at ST306), then the processing terminates at ST306, whereas if the operated player character has made a motion of kicking the ball (Yes at ST306), then the ball path of travel setting section 104 converts the pressure value for the shoot button 512 (as set at ST303, ST304) to a ball speed (speed in the horizontal direction of the ball) (ST307).

The ball path of travel setting section 104 also sets the angle of the ball in the horizontal direction (speed of the ball in the horizontal direction), from the operated player character towards the goal, according to the position of the left analogue stick 501 (as obtained at ST301)(ST308), (the time for which the shoot button 512 is depressed being detected by the button press detecting section 103), and the longer the depression time of the shoot button 512, then the greater the vertical angle (initial speed of ball in vertical direction) causing the ball to rise (ST309).

In the processing at step ST308, the angle of the ball in the horizontal direction is set as illustrated by the schematic game screen 203 in FIG. 11. In other words, if the user inclines the left analogue stick 501 in direction 621 (upward direction in the controller 5 shown in FIG. 1), then the angle of the ball in the horizontal direction will be set in such a manner that the ball follows path of travel 321 towards the goal (upper portion of the diagram), and if the user inclines it in direction 622, the horizontal angle will be set such that the ball follows path of travel 322, . . . and if the user inclines it in direction 625, the ball the horizontal angle will be set such that the ball follows path of travel 325.

In the processing in step ST309, the angle of the ball in the vertical direction is set as illustrated by the schematic game screen 204 in FIG. 12. In other words, if the user continues to depress the shoot button 512 for a sufficiently long period of time, then the angle of the ball in the vertical direction will be set in such a manner that the ball follows the path of travel 326 towards the goal (shown to the side of the diagram) 702, whereas if the user depresses the shoot button 512 for a short period of time, then the angle in the vertical direction will be set in such a manner that the ball follows path of travel 327.

Next, the ball path of travel setting section 104 converts the speed at which the left analogue stick 501 is inclined (as obtained at ST301) to the magnitude of the angle at which the ball rises (falls) (the vertical acceleration of the ball) (ST310). (Here, it is converted in such a manner that the greater the speed at which the left analogue stick 501 is inclined, the smaller the angle at which the ball rises).

Thereupon, similarly to lofted pass button processing, curve processing as illustrated in FIG. 7 is implemented (S311), thereby setting a curve for the ball, and drawing is started for depicting a motion whereby the ball moves from the operated player character towards the goal in a shoot operation, whereupon the shoot button processing terminates.

In this way, by means of the shoot button processing, the speed of the ball (in the horizontal direction) is set to a greater speed, the larger the pressure exerted on the shoot button 512, and hence the user is able to experience a soccer game producing a more realistic sensation of being a player.

Moreover, according to this shoot button processing, the longer the shoot button 512 is depressed, the greater the initial angle set for the ball in the vertical direction (initial speed of the ball in the vertical direction), the position in which the left analogue stick 501 is inclined and the speed at which the left analogue stick 501 is inclined, whilst depressing the shoot button 512, are detected, the angle of the ball in the horizontal direction being set according to the position of the left analogue stick 501 and the vertical downward acceleration of the ball being increased, the greater the speed at which the left analogue stick 501 is inclined, and hence it is possible to play a game that is highly responsive and highly interesting, by means of few button operations.

FIG. 13 is a flowchart showing the procedure of fast dribble button processing executed when the fast dribble button 514 is depressed.

In a "fast dribble" operation, the operated player character moves across the field at accelerated speed, whilst keeping possession of the ball.

In fast dribble button processing, firstly, the button press detecting section 103 (see FIG. 2) obtains two pressure detection values, $\frac{1}{60}^{th}$ second and $\frac{1}{30}^{th}$ second after the search pass button 514 has been depressed, whilst simultaneously, and then determines whether or not the pressure value obtained after $\frac{1}{30}^{th}$ second is greater than the pressure value obtained after $\frac{1}{60}^{th}$ second (ST402), the higher pressure value being set for use in subsequent processing (ST403, ST404).

Thereupon, the ball path of travel setting section 104 determines whether or not the pressure value thus set is greater than a prescribed reference values (for example, 160) (ST405).

If the pressure value is not greater than this prescribed value (No at ST405), then the ball path of travel setting means 104 sets the movement of the ball in such a manner that a normal dribble is performed, and the drawing control section 101 starts drawing for a motion wherein the operated player character performs a dribble (ST406), whereas if the pressure value is greater than the reference value (Yes at ST405), then the ball path of travel setting section 104 sets the movement of the ball in such a manner that a dribble is performed whilst kicking the ball by a distance corresponding to the pressure value (the distance can be set corresponding to the 95 level steps between pressure values of 160 to 255), and the drawing control section 101 starts drawing of a motion wherein the operated player character performs a dribble (ST407), whereupon the dribble button processing terminates.

In this way, according to fast dribble button processing, the harder that the fast dribble button 514 is depressed, the harder the player character kicks the ball when performing a dribble, and hence a variety of instructions can be given selectively by the user, by means of few button operations, thereby making it possible to play a game that is highly responsive and highly interesting.

According to the first to fourteenth aspects of the present invention, the user is able to play a game (modelled on a sport such as soccer, or the like) with a more realistic sensation of being an actual player, by means of momentary button or switch operations.

Moreover, according to the fourth, fifth, eighth to tenth, eleventh and twelfth aspects of the present invention, in particular, a variety of instructions can be given selectively by the user, by means of few button operations, and hence the user is able to play a game that is highly responsive and highly interesting.

This application is based on Japanese patent application serial no. 2000-148682 filed on May 19, 2000, the contents of which are hereby incorporated by reference.

Although the present invention has been fully described by way of examples with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A readable storage medium storing an action game program, said program comprising the steps of:

receiving input of a first instruction relating to an action with respect to a same team player character, for a player character in possession of a ball existing in a game space and displayed on a screen;

receiving input of a second instruction specifying a reference direction originating at said player character by means of a prescribed stick;

performing control in such a manner that the ball is moved in accordance with the input first instruction, to a same team player character in the reference direction according to the input second instruction, without touching the ground on the way;

detecting a speed at which the stick is inclined;

setting a height that the ball reaches according to the detected speed; and judging whether or not a same team player character is present at a ball landing point set according to said height reached by the ball, and if it is judged that a same team player character is so present, then the ball is controlled such that it moves to the same team player character, whereas if it is judged that no same team player character is so present, then the ball is controlled such that it moves in said reference direction.

2. A readable storage medium storing an action game program according to claim 1, further comprising the steps of:

receiving input of other instructions for a particular same team player character by means of prescribed buttons;

performing control in such a manner that prescribed actions are performed in accordance with the input instructions;

detecting a force with which a button is depressed is detected; and setting a speed of said action according to the detected force.

3. A readable storage medium storing an action game program according to claim 2, wherein:

same team player characters including the the particular same team player character, and opposing player characters, compete for possession of the ball in a game space; and said action is a sliding tackle performed by the particular same team player character who is not in possession of the ball against an opposing player character who is in possession of the ball.

4. A readable storage medium storing an action game program according to claim 2, wherein:

same team player characters including the particular same team player character, and opposing player characters compete for possession of the ball in a game space; and said action is a dribble performed by the particular same team player character that is in possession of the ball.

5. A readable storage medium storing an action game program, said program comprising the steps of:

receiving input of a first instruction relating to an action with respect to a same team player character, to a player character in possession of a ball existing in a game space and displayed on a screen, by means of prescribed buttons, receiving input of a second instruction specifying a reference direction originating at said player character;

performing control in such a manner that the ball is moved in accordance with the input first instruction, to a same team player character located within a prescribed horizontal angle from the reference direction according to the input second instruction;

detecting a force with which a button is depressed; and setting a magnitude of said horizontal angle according to the detected force.

6. The readable storage medium storing an action game program according to claim 5, further comprising the steps of:

judging whether or not a same team player character is present within the horizontal angle set to said magnitude, and if it is judged that a same team player character is so present, then the ball is controlled such that it moves to the same team player character, whereas if it is judged that no same team player character is so present, then the ball is controlled such that it moves in said reference direction.

* * * * *